United States Patent [19]
Webb et al.

[11] Patent Number: 5,278,674
[45] Date of Patent: Jan. 11, 1994

[54] METHOD AND APPARATUS FOR PROVIDING ILLUMINATION COMPENSATION IN A DOCUMENT SCANNER

[75] Inventors: Steven L. Webb; Edward S. Beeman, both of Loveland; Kenneth D. Gennetten, Fort Collins, all of Colo.; Craig L. Miller, Boise, Id.

[73] Assignee: Hewlett-Packard Company, Palo Alto, Calif.

[21] Appl. No.: 990,363

[22] Filed: Dec. 14, 1992

Related U.S. Application Data

[63] Continuation of Ser. No. 908,768, Jul. 1, 1992, abandoned, which is a continuation of Ser. No. 470,291, Jan. 25, 1990, abandoned.

[51] Int. Cl.⁵ .............................................. H04N 1/04
[52] U.S. Cl. .................................... 358/475; 358/474
[58] Field of Search ................ 358/475, 474, 446, 401

[56] References Cited

U.S. PATENT DOCUMENTS

| | | | |
|---|---|---|---|
| 4,408,231 | 10/1983 | Bushaw et al. | 358/475 |
| 4,491,961 | 1/1985 | Sutton et al. | 358/446 |
| 4,554,583 | 11/1985 | Saitoh et al. | 358/461 |
| 4,803,556 | 2/1989 | Beikirch | 358/475 |

FOREIGN PATENT DOCUMENTS

WO90/04900 5/1990 European Pat. Off.
4020817 1/1991 Fed. Rep. of Germany.

OTHER PUBLICATIONS

European Search Report, Application Number EP 91 30 0557, 2 pages.

Primary Examiner—Edward L. Coles, Sr.
Assistant Examiner—Thomas L. Stoll

[57] ABSTRACT

A document scanner is disclosed wherein means are provided to dynamically compensate for any changes in document illumination intensity that may occur as a document is scanned. The compensation method and apparatus operates to measure the intensity of light that is reflected from a target area that borders an edge of the document being scanned. The target area is a narrow, elongated, area that extends in the scan direction. The target area is of a color to approximate the document's background area, i.e. the document's nonimage area. Since the target area is of a continuous and uniform color tone, any variation in the quantity of light that is reflected from the target area is caused by a variation in the intensity of illumination thereof by the scanning light source. The method and apparatus of the invention controls the scanning light source so as to maintain the light reflected from the target area at a substantially constant magnitude.

7 Claims, 5 Drawing Sheets

METHOD AND APPARATUS FOR PROVIDING ILLUMINATION COMPENSATION IN A DOCUMENT SCANNER

CROSS REFERENCE TO RELATED APPLICATION(s)

This is a continuation of copending application Ser. No. 07/908,768 filed on Jul. 1, 1992, now abandoned which is a continuation of copending application Ser. No. 07/470,291 filed on Jan. 25, 1990, now abandoned.

Related Application

Copending application Ser. No. 07/470,292, entitled Method and Apparatus for Providing Sensor Compensation in a Document Scanner, filed of even date herewith, is incorporated herein by reference.

FIELD OF THE INVENTION

This invention relates to the field of document scanning, and more specifically to a method and an apparatus that compensates for any document illumination intensity variation that may occur during the scanning of a document.

BACKGROUND OF THE INVENTION

The technology of document scanning relates to a method and an apparatus whereby the visible image(s) carried by a document is converted to an electronic image signal, for use by a variety of electronic processing means.

In accordance with well known techniques, the scanning of a document operates to divide the document into an X-Y matrix comprising a large number of individual picture elements (PEL or PELS) equal in number to X times Y. The scanner apparatus generates an electronic image signal for each document PEL.

The document's visual image is converted into an image signal by the scanning process. This image signal can be used in many ways. For example, the image signal can be transmitted to remote locations for storage or for reproduction by a printer, or the image signal can be manipulated in a manner to enhance or change the image, or the image signal can be merged with other image signals.

Very simplistically, if a portion of the document's black image (assuming the document comprises a black image on white paper background) is detected within a document PEL, the binary signal "0" can be generated, in which case, the absence of a portion of the document's black image at a PEL location (i.e. the PEL contains only the white document background) results in a binary "1" being generated.

Usually, however, the image signal that is generated for each document PEL is a multi-bit digital signal. This is desirable since a multi-bit signal allows the sensing of different levels of blackness within each PEL area of the document (i.e. gray scale PEL information can be provided). Thus, a 4-bit signal per PEL allows 16 different color-shades of document image (i.e. white, 14 different shades of gray, and black) to be generated for each document PEL. The range of values of such a 4-bit signal would vary from a low value of hexadecimal "0", to a high value of "F". When an 8-bit per PEL signal is generated, the 256 different signals represent 256 different color-shades of document image for each document PEL. The range of values of such an 8-bit signal would vary from a low hexadecimal value of "00" to a high value of "FF".

A preferred embodiment of the present invention provides a document scanner that generates an 8-bit signal for each document PEL. The scan word "00" represents a black PEL. The scan word "FF" represents a white PEL, and intermediate value words represent shades of gray PELS. However, as those skilled in the art will readily appreciate, the invention is of general utility and is not to be limited to this specific multi-bit scan signal format.

Document scanners are conventionally provided with a generally horizontal, flat, glass platen on whose upper surface a document is placed, image side facing down, for scanning. The document can then be scanned by moving a line of light, or a linear footprint or zone of light, relative thereto, or alternatively the document can be scanned by moving the document relative to a stationary light footprint. The present invention will be described with reference to a moving-light document scanner. However it is to be understood that the invention is not to be limited to this particular type of scanner.

The convention used in the following description considers the direction in which the line of light extends to be the X direction. This is the direction in which the document PEL rows extend. The orthogonal scan direction is the Y direction. This is the direction in which the document PEL columns extend.

Each incremental scan position of the light footprint relative to the document defines a document row. While the scan operation usually comprises continuous motion, within the invention it need not be so, and in any event, the sequential reading out of the document sensor array has the effect of converting the document into a plurality of discrete rows. As will be appreciated, the position of the individual document columns is determined by the physical location of the individual sensor cells within the sensor array.

The prior art recognizes the problems that are created in document scanners by a variation in the amount of light that is emitted by the scanning light source. While various means, such as careful selection of the type of light source to be used, frequent replacement of the light source, and delaying the beginning of document scanning until the light source has reached full operation temperature, have been used in the art, all of these expedients are costly and/or prevent immediate use of the document scanner. For example, conventional light sources used in scanner devices require ten seconds or more after initial energization for a stabile light output to be reached.

Thus, the need exists for a scanner method and apparatus that will compensate for illumination changes in the scanning light source in a dynamic manner, for example during each and every document scan, to thereby allow document scanning to begin within a second or two after the light source has been initially energized.

SUMMARY OF THE INVENTION

The present invention will be described while making reference to a document that comprises a generally opaque substrate (i.e. a sheet of white paper) that carries a contrasting color, humanly perceptible, image thereon. However, the spirit and scope of the invention is not to be limited thereto. For example, the present invention finds utility where the document comprises a transparent substrate that carries an image, for example a well known 35 mm photographic slide.

The present invention provides a document scanning method and a document scanning apparatus that compensates for changes in the illumination output of a scanning light source, preferably, but without limitation thereto, during each and every document scan. In addition, and in accordance with a feature of the invention, document scanning begins within a few seconds after the light source is initially energized, i.e. there is no need for the light source to reach its full operating condition before document scanning begins.

An object of the invention is to provide a document scanner wherein a document is illuminated by light source means during scanning of the document, wherein a light sensitive array provides output signals in proportion to light that is received from discrete areas of the document during scanning thereof, and wherein compensation means are provided to dynamically compensate for any document illumination change that may occur during the document scanning operation.

A further object of the invention is to provide target means positioned to be illuminated as the document is illuminated, wherein individual portions of the sensor array are associated with scanning of this target means, and wherein the output signal that is provided by these individual sensor portions during a document scan operates to variably control energization of the light source means such that substantially constant illumination is reflected from the target means during a scan operation.

As a further feature of the invention a scanner apparatus includes a platen means supporting a document for scanning, and target means is located adjacent to the platen means, such that during a document scan both the target means and the platen means are illuminated by the light source means.

As a feature of the invention, the above mentioned target means replicates the background color characteristic of a document, for example a document having a white background. In a preferred embodiment, the target means provides for about 90% of the light that the target means receives from the light source means to be reflected to a light sensor array means.

As a feature of the invention the above mentioned target means is elongated to span a distance of the platen means that is generally equal in length to the length of a document scan.

As a further feature of the invention, a default level of energization is provided for the light source means prior to the beginning of a document scan, and a means responsive to the output signal from the light sensitive means prior to the beginning of a document scan is connected in controlling relation to the signal processing means to adjust the transfer function thereof so as to minimize the likelihood of saturation of the signal processing means as a document is subsequently scanned, during which scan light source means becomes usually more efficient, and energization of the light source means is accordingly reduced, in order to maintain the actual illumination of the document substantially constant.

As a feature of the invention, adjustment of the above mentioned transfer function, and compensation for any variation in the illumination intensity of the light source means, occur prior to and during substantially every document scan, respectively.

In accordance with a feature of the invention, compensation for any dark/light sensitivity variation that may exist between the individual sensor cells of the sensor array is provided, as is described in detail in the above mentioned copending application, prior to the beginning of a scan operation during which the above mentioned target means and a document are concomitantly scanned.

These and other objects and advantages of the invention will be apparent to those skilled in the art upon reference to the following detailed description wherein reference is made to the drawing.

DETAILED DESCRIPTION OF THE INVENTION

A stationary document, moving light source, document scanner apparatus 10 embodying the invention is shown in FIGS. 1-4. This scanner is of the general type in which the present invention finds utility. However, the spirit and scope of the invention is not to be limited thereto.

Figure 1:
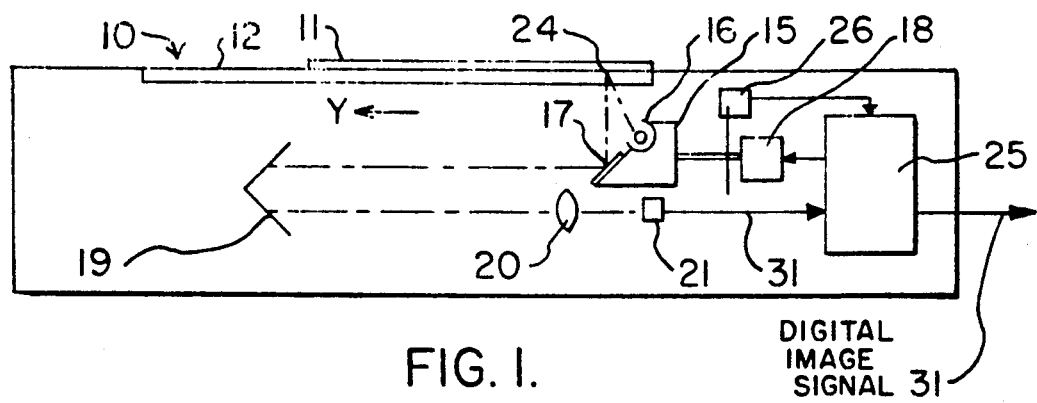
FIG. 1 is a showing of a moving light source document scanner that includes the present invention.

In scanner 10 of FIG. 1, document 11 is positioned on transparent platen 12 with its visual image facing downward. Without limitation thereto, document 11 typically comprises a black image on a white background. The document is scanned, so as to convert the black visual image contained thereon into an electronic signal image that is useable by data processing machines and the like.

The scanning process, whose details are not critical to the invention, is accomplished by a movable carriage 15 that contains a light source 16 and a cooperating reflecting mirror 17. Motor 18 is mechanically coupled to carriage 15, as by gears, cables or the like, to move carriage 15 in the Y scan direction, along the length of platen 12. The light reflected from the document is redirected by movable corner mirror 19 into lens 20 and thence into sensor array 21. A maximum amount of light is typically reflected from the document's white background areas, whereas a minimum amount of light is reflected from the document's dense black image areas.

As is well known in the art, mirror 19 is mounted for movement concurrently with carriage 15, but at one half the velocity of carriage 15, so that the optical path length from the object plane of scan light footprint 24 to the image plane of sensor array 21 is maintained constant.

In an alternate embodiment of the invention (not shown), light source 16, a system of reflecting mirrors, lens 20 and sensor array 21 were all mounted at fixed positions on movable carriage 15.

Figure 2:
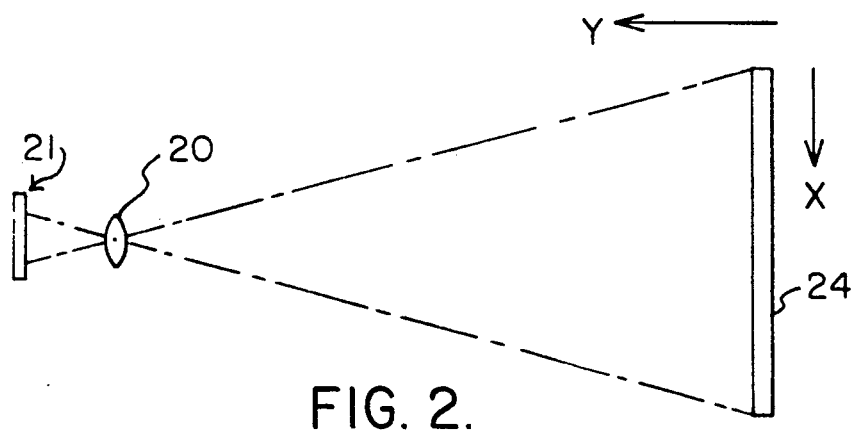
FIG. 2 shows the object-plane/image-plane optical path of the FIG. 1 scanner in its unfolded state.

Sensor array 21, without limitation thereto, is preferably a charge coupled device (CCD) that is configured as a linear array of discrete light sensitive cells or light detector cells 22 (see FIG. 2). Each cell 22 of sensor array 21 defines a document picture element (PEL). CCD's which can distinguish 400 PELS or cells per inch on the document provide good quality resolution and are readily available from contemporary commercial sources.

Light source 16 is constructed and arranged, in a manner well known to those of skill in the art, to produce a line of light, linear zone of light, or light footprint 24 on platen 12. Light footprint 24 extends in the X direction relative to document 11, perpendicular to the above defined Y scan direction. Each incremental position of light footprint 24 defines a row of document PELS. As footprint 24 moves (i.e. as the document is scanned and light footprint 24 moves in the Y direction) the document is broken down into a number of parallel rows that extend in the X direction, each row being a large number of document PELS in length.

In FIG. 2, a typical 8.5 inch long image scan line 24 (also note numeral 24 in FIG. 1) is optically reduced in length as it passes through lens 20 in a ratio of, for example, 7.7:1 before reaching CCD sensor array 21. Note that linear sensor array 21 also effectively extends in the above defined X direction relative to document 11.

The analog electrical signal content 23 of sensor array 21 (see FIG. 3) is periodically read out, document row by document row, as carriage 15 moves in the Y direction relative to document 11 on platen 12.

The analog output signals 23 from the individual cells 22 of sensor array 21 are converted to digital signals, and these digital signals are then coupled to electronic controller 25 (see FIG. 1). Controller 25 provides drive control signals to motor 18, and may also receive position or movement feedback information relative to carriage 15 and/or mirror 19, such as from the output of a tachometer position detector 26, from a carriage home sensor (not shown), and a carriage end of scan sensor (not shown).

Figure 3:
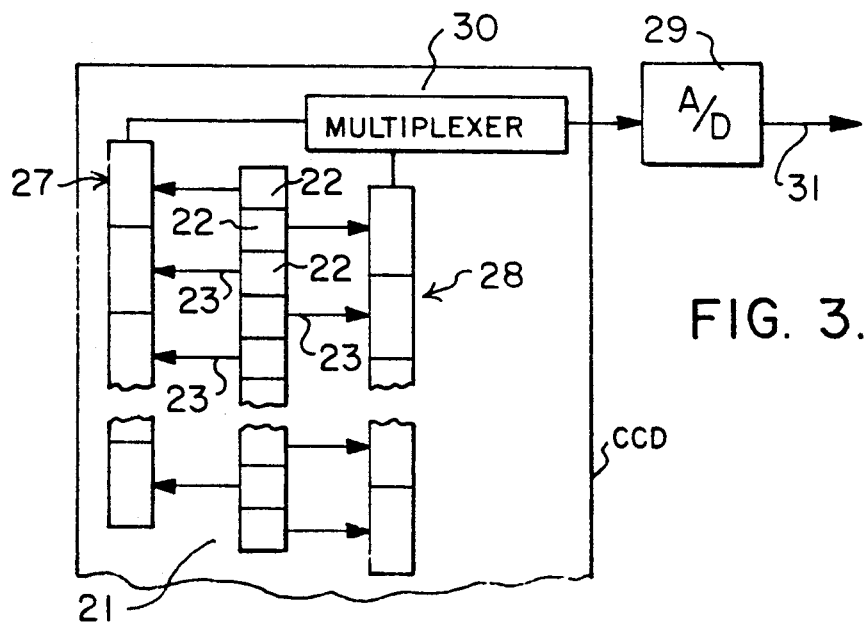
FIG. 3 shows the manner in which the analog output signals of the individual sensor cells of FIG. 1 are converted to digital signals.

FIG. 3 illustrates an arrangement for reading out the analog signal content 23 of array 21. By means of gating signals (not shown), the analog signal content 23 of every other cell 22 of sensor array 21 is coupled in parallel into analog shift register 27, while the analog signals present in the other intervening cells 22 are coupled in parallel into analog shift register 28. That is, in this embodiment of the invention, but without limitation thereto, the content of the odd numbered cells 22 of array 21 are periodically transferred to shift register 29, whereas the even numbered cells 22 have their content transferred to shift register 28 at the same periodic time.

The analog signals 23 that are loaded into shift registers 27 and 28 are representative in magnitude of the various light levels that are reflected from the individual PELS of document 11 for that document row. The magnitude of each of these analog signals 23 corresponds to the average of the light that is reflected from a small incremental surface area or PEL of document 11 over a predetermined period of time.

Subsequent to transfer into registers 27 and 28, the analog signals 23 are shifted serially into analog to digital converter (A/D) 29 by way of multiplexer 30. Digital output 31 of A/D 29 is a sequence of multi-bit digital data, for example one byte of data, for each document PEL. Each of those data bytes is encoded so as to correspond digitally to the magnitude of a discrete one of the analog signals 23 that is retrieved from shift registers 27 and 28, and thus the binary magnitude of each byte corresponds to the magnitude of the reflected light that is provided by one of the document PELS. That is, if array 21 detects 400 cells or PELS per document inch, output 31 of A/D 29 comprises a similar 400 bytes per inch.

Light source 16 is an electrically energizable source, for example a fluorescent tube or lamp. In a typical scanner, but without limitation thereto, source 10 is energized prior to the beginning of a document scan, and is deenergized at the end of a document scan. At the end of a document scan carriage 15 returns to its home position (i.e. carriage 15 moves to the right in FIG. 1). When the next document scan is requested, for example by way of a scan signal produced by a host computer (not shown), source 16 is energized, but the beginning of scan movement is delayed a second or so to allow source 16 to achieve a somewhat stable light output.

Light source 16, when configured as a linear light source such as a fluorescent tube, typically has a maximum intensity at its X direction midpoint, and intensity decreases toward the ends of the light source. If desired, a dog-bone shaped aperture (not shown) can be placed between light source 16 and platen 12 to cause light footprint 24 to be of a more uniform intensity from end to end.

The present invention provides a means for controlling the energization of source 16 so as to effectively minimize a variation in illumination intensity during a document scan.

Figure 4:
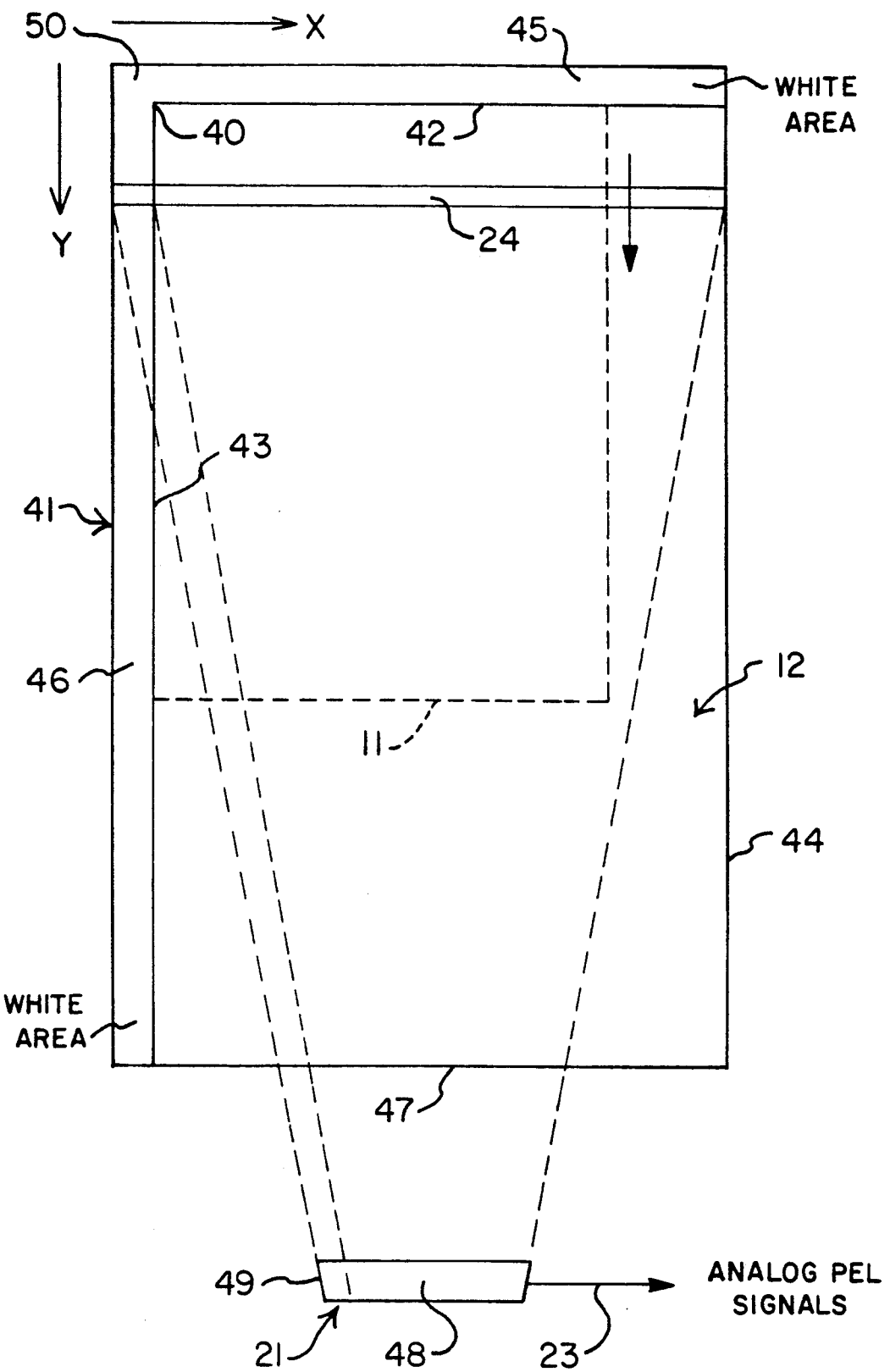
FIG. 4 is a bottom view of the document platen shown in FIG. 1, showing an exemplary document that is corner referenced to one corner of the platen, showing a white, L-shaped, reflection target means that is located adjacent to two orthogonal edges of the platen, and showing the scan line of light at a position that is spaced a short distance from its home position.

With reference to FIG. 4, this Figure shows the rectangular, planar shape of platen 12, as seen from the underside thereof, i.e. from the side of platen 12 that is adjacent to light source 16. Dotted lines are provided to show a typical document 11 that is supported on the upper surface of platen 12. The position of the document on the platen is not critical, but it is shown as being referenced to, or positioned to, corner 40 of the platen, without limitation thereto. Sensor array 21, which preferably is a CCD array, is shown viewing the platen area that is momentarily defined by moving light footprint 24. Note that for simplicity the mirrors and the lens of FIGS. 1 and 2 are not shown.

In terms of document scan direction, edge 42 of the platen and of document 11 (i.e. the edge that is located to the right as seen in FIG. 1) is the beginning of scan edge or area, parallel edge 47 of the platen is the end of scan edge or area, and edges 43 and 44 are the orthogonal side edges or areas of platen 12.

In accordance with the invention, a reflection target means 41 is mounted closely adjacent to one or both of the side edges 43,44 of platen 12. In the embodiment of the invention shown in FIG. 4, target means 41 is generally L-shaped, having a first portion 45 of the target means located adjacent to leading platen edge 42, and having a second portion 46 thereof located adjacent to orthogonal side platen edge 43.

First target portion 45 defines the approximate home position of scanning line of light 24, i.e. the beginning of scan position. Note that in FIG. 4 a scan operation is underway since line of light 24 is shown as having already scanned a small portion of document 11.

Both portions 45,46 of target means 41 are opaque and both are colored, for example colored to simulate or duplicate the background color tone of typical documents to be scanned. For example, since most documents provide a low reflectance black or colored image on a highly reflective white background, it may be preferable that target 41 be white, or essentially white color tone. The exact reflection characteristics of target 41 are not critical to the invention. All that is required is that the reflection characteristics be predefined. For example, in a preferred embodiment of the invention target 41 was constructed and arranged so as to reflect about 90% of the light impinging thereon.

Portion 46 of target means 41 is the portion of the target means of interest relative to the present invention. As stated, the exact color tone or reflectance characteristic of the target portion 46 that is utilized in accordance with the invention to provide document scanner illumination compensation is not critical to the invention, and this parameter can be varied within the spirit and scope of the invention. In a preferred embodiment of the invention, but without limitation thereto, it was found desirable to provide a known white color tone (i.e. a color tone humanly perceived as white or a shade of white) for target portion 46, such that when the target portion was illuminated by light source 16, the target provided a percent of light reflection that was somewhat less (for example about 90%) than the reflection that would be expected from the most reflective document area that is discernible as such by the scanner apparatus.

Target portion 46 extends in the Y direction, parallel to the document's PEL columns, normal to the platen's leading edge 42, and normal to the document's PEL rows. As measured in the X direction, portion 46 is about ¼ inch wide.

As will be described, in accordance with the present invention target portion 46 is used to provide compensation for changes in the output illumination that is provided by light source means 16, both during an individual document scan during the life of scanner apparatus 10. Changes in the illumination intensity of source 16 may be short term changes, such as those caused by warmup of source 16 during an individual document scan, and/or these changes may be long term in nature, such as those occurring from aging and/or contamination of light source 16. Short term changes usually provide an increase in illumination intensity with the passage of the relatively short document scan time, whereas long term changes usually provide decreased illumination intensity with the passage of a relatively longer time period.

Portion 45 of target means 41 is of a similar PEL size to portion 46 (as is measured in the Y direction). Portion 45 of the target means is used to provide compensation for differences in dark/light sensitivity of individual sensor cells 21, as is described in above mentioned copending application Ser. No. 07/470,292, entitled Method and Apparatus for Providing Sensor Compensation in a Document Scanner, filed of even date herewith.

CCD array 21 contains a relatively long area 48 of sensor cells 22 that is used to detect the content of the individual PELS of document 11, or of a window area within document 11. Array 21 also contains a relatively short area 49 of sensor cells 22 which are dedicated solely to viewing Y direction target portion 46, including a top portion 50 thereof that is in common with target portion 45. As will be apparent, the invention operates to cause array portion 49 to view target portion 46 during each and every document scan, while light source 16 is energized to illuminate platen 12 and target means 41, in order to perform compensation for light source 16 illumination intensity variation, as will be described.

As will be appreciated by those of skill in the art, sensor portion 48 relies upon the magnitude of light that is reflected from each of the PEL areas of document 11 in order to construct an electrical equivalent of the document's visible image. In order for this process to be accurate, it is necessary that all document PEL areas be subjected to the same quantity or intensity of light from moving light source 16. The present invention insures that this will in fact occur as light footprint 24 moves in the Y direction.

Since target means 41 is contained within a closed scanner housing (not shown), the target means is substantially in total darkness when source 16 is not active. When document 11 is illuminated by light source 16, target means 41 is subjected to illumination from this same light source 16.

In accordance with a feature of the invention, a light source compensation signal is computed and stored for each document row as the document is scanned row by row. This signal is then checked to determine if any deviation from an expected illumination intensity has occurred. The result of this checking operation is then dynamically used during the scan to minimize or eliminate any error in the image signal that would otherwise be produced due to uneven row by row illumination of document 11.

In accordance with a feature of the invention, the compensation means for light source 16 is calibrated, in preparation for its later operation during a document scan, by first viewing the top portion 50 of target means 46, i.e. the portion of target means 41 that is common to target portions 45 and 46. More specifically, the gain of a circuit element that processes the signal from array portion 49 is adjusted in preparation for the immediately following document scan operation, as will be described.

In accordance with a feature of the invention, the individual sensor cells 22 (FIG. 3) of array portion 49 are dark/light sensitivity compensated prior to the scanning of target portion 46, by viewing the top portion 50 of target means 46 as light source 16 is first deenergized and then energized. As a result of this procedure, a dark/light sensitivity compensation byte is loaded into compensation RAM 90 of FIG. 9 for each such cell, for later use during the scanning of target portion 46, as will be described.

Figure 5:
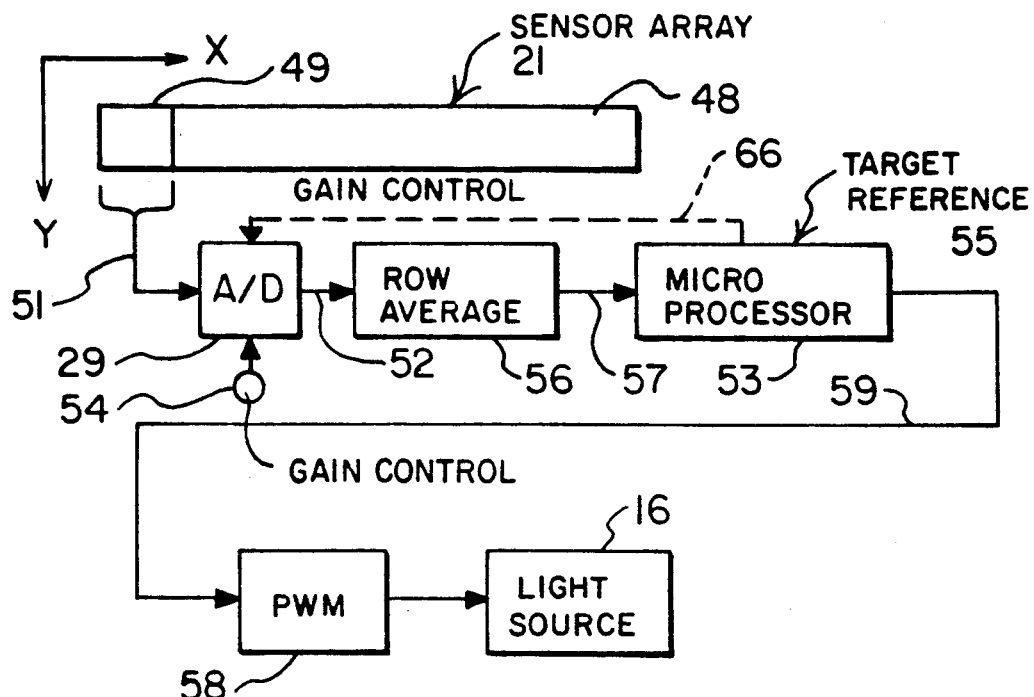
FIG. 5 is a circuit showing of the invention wherein the overall gain of the illumination compensation circuit means is periodically adjusted by way of a manual adjustment, or alternatively the gain is adjusted prior to the beginning of every document scan operation.

FIG. 5 is a showing of a circuit embodiment of the invention. As has been stated, operation of the invention provides dynamic compensation for both short term and long term changes in the intensity of illumination output from light source 16.

As these intensity changes occur, it is desirable that the illumination intensity measuring signal 51 that is provided by target portion 46 and array cells 49 should not drive the signal processing means of FIG. 5 into saturation. Should saturation occur, control of light source energization will no longer be effective to maintain constant document illumination.

FIG. 5 shows both a first form of the invention, and a dotted line alternate form of the invention for preventing such signal saturation. The first form of the invention provides manual and periodic adjustment of circuit means gain by way of manual adjustment means 54. The alternate form of the invention makes use of dotted control line 66 and dotted target reference signal 55 to provide automatic and dynamic gain adjustment of the circuit means during a document scan.

In the first form of the invention, manual gain control adjustment means 54 is used to adjust the gain of the signal processing means as the scanner apparatus is manufactured, and perhaps periodically thereafter during maintenance of the scanner, to thereby insure that the signal processing means of FIG. 5 will not be driven into saturation by variations in signal 51.

In another form of the invention, microprocessor 53 compares the signal 51 that is received from sensor cells 49 prior to the beginning of document scanning to a target reference signal 55, and accordingly adjusts the gain of the FIG. 5 signal processing means (i.e. adjusts the gain or transfer function of A/D convertor means 29) to insure that it will not be driven into saturation.

Thus, in accordance with this feature of the invention, the gain of the FIG. 5 circuit means (i.e. the circuit means that accepts output signal 51 from sensor array cells 49 during scan of Y direction target portion 46) is adjusted to produce a generally mid range A/D output signal 52 prior to the beginning of a document scan.

Considering the first embodiment of the invention, upon initial energization of light source 16, a predetermined default level of light energization is selected for light source 16. This energization level may, for example, be somewhere within the range of from 70 to 90 percent of the manufacturer's rated voltage and/or current for light source 16. However, within the spirit and scope of the invention, means may be provided to allow the user or the microprogrammer to adjust this default level as desired, so long as the ratings of light source 16 are not exceeded.

In this embodiment of the invention, the magnitude of A/D output signal 52 is measured by microprocessor 53 at or before the beginning of a document scan operation, and this magnitude is stored, to be later used as a reference signal 55 against which signal 52 will be compared as the document scan operation proceeds. When a variation in signal 52 is detected during a document scan operation (for example the magnitude of signal 52 may increase due to lamp warmup as the document scan continues), microprocessor 53 operates to change the magnitude of energization of light source 16 so as to maintain signal 52 equal to, or substantially equal to, the aforementioned reference signal.

As a feature of the invention, but without limitation thereto, scan row averaging means 56 operates to average the plurality of signals that are received from array cells 49 for a number of X direction scan rows. More specifically, and for purposes of simplicity, assume that there are four sensor cells 49 that view target portion 46 (in practice there are many more that four), four analog signals 51 are thus provided to A/D 29 for each scan row, as was described relative to FIG. 3. As a result, output 52 of A/D 29 comprises four binary numbers whose magnitudes are representative of the magnitude of these four analog signals 51.

In a preferred embodiment of the invention, A/D 29 provided an 8-bit binary output 52 for each of the four analog input signals 51 applied thereto. In this embodiment of the invention, manual adjustment means 54 was set so that nominally the output 52 of A/D 29 would be substantially equal to some mid range hexadecimal value when the above mentioned default value of energization was applied to light source 16.

Row averaging means 56 operates to provide a single binary output 57 from the four 8-bit signals 52 that are provided for each scan row. In this way, should the reflection characteristics of target portion 46 be contaminated, for example with a dirt speck and the like, the single output signal 57 that is provided for each scan row will continue to provide an accurate measurement of the illumination intensity of light source 16 for that scan row.

As a further feature of the invention, but without limitation thereto, a controllable pulse width modulator means (PWM) 58 is provided to energize light source means 16, in a manner well known to those of skill in the art. PWM 58 is controlled by the binary output 59 of microprocessor 53 in a manner to maintain the illumination output of light source 16 substantially constant during a document scan.

In summary, assume that the illumination intensity of light source 16 increases as a document scan operation continues. As explained, this increase in the effective strength of light source 16 may be due to the warming up of the light source to near its rated operating temperature. In this case, signal 52 increases in magnitude, and microprocessor 53 senses this increase in magnitude and operates to control PWM 58 so that the energization of light source 16 is reduced. As a result, signal 52 reduces in value, i.e. signal 52 is maintained at the prior measured value that comprises the reference value 55 for this signal, and the intensity of the illumination that is reflected from target portion 46 is thus maintained substantially constant throughout the scan operation.

In a second embodiment of the invention shown in FIG. 5, a means is provided to dynamically control the gain or transfer function of A/D 29 prior to a document scan. In this embodiment of the invention, the signal magnitude 52 that is produced by sensor portion 49 for the initial default level of light source energization is measured, and as a result thereof microprocessor 53 operates to adjust the gain of A/D 29 so that A/D 29 produces an output signal 52 that is equal to approximately one half of the A/D's output range.

This operation ensures that the circuit means of FIG. 5 will be able to process a relatively wide swing in the magnitude of output signal 51 from array portion 49 during a subsequent document scan, should such a wide swing in output signal 51 be received.

Figure 6:
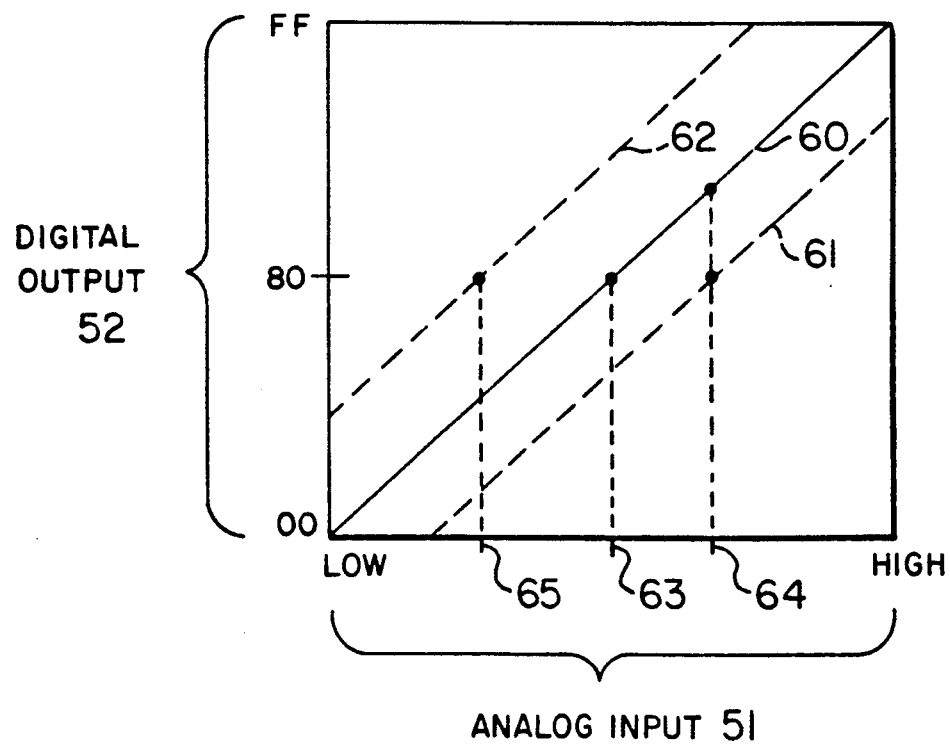
FIG. 6 shows the manner in which the overall gain of the circuit means of FIG. 5 is adjusted in accordance with the feature of the invention shown in FIG. 5.

While this gain initialization function can be accomplished in a number of ways, FIGS. 5 and 6 shows adjusting the overall circuit means gain by changing the transfer function of A/D 29. Preferably, but without limitation thereto, this gain adjustment is made prior to the beginning of each document scan. It should be noted that once the overall gain of the FIG. 5 circuit means is adjusted, the gain remains at the adjusted value for the duration of that scan.

It will be remembered that light source 16 is energized a second or so before scan motion begins. This short delay allows light source 16 to reach a somewhat stable light output, but usually not the light output that will be achieved after a prolonged period of energization. FIG. 6 shows how the magnitude of the light source's output (i.e. the magnitude of analog signal 51 of FIG. 5) just prior to the beginning of a document scan is used to adjust the transfer function of A/D 29 shown in FIG. 5.

Just prior to the beginning of scan motion, or perhaps during the initial portion of scan motion, and after the short delay following initial energization of light source 16, the output 51 of array portion 49 is sampled by microprocessor 53. The magnitude of this signal (which is a measure of the magnitude of the light that is reflected from the top common-corner portion 50 of the two orthogonal target portions 45,46 shown in FIG. 4) is processed so as to adjust the transfer function of A/D 29. FIG. 6 shows three exemplary transfer function lines 60, 61 and 62.

Initially the gain of A/D 29 is set to produce the default transfer function line 60. With the default energization level applied to light source 16, it is expected that the analog output signal 51 from array portion 49 will be substantially the magnitude shown at 63 in FIG. 6. If this is true, the binary output of A/D 29, whose full range of output is from hexadecimal "00" to "FF", will be about hexadecimal "80". In this case the transfer function of A/D 29 is not changed from its above mentioned default condition 60.

Assume however that the analog output 51 from sensor portion is actually at the magnitude shown at 64 in FIG. 6. As a result, the actual output 52 that is provided by A/D 29 is higher than "80". Microprocessor responds to this higher than expected value of A/D output 52 and implements a change in the gain or transfer function of A/D 29 by means of control line 66, causing the transfer function line of the A/D to shift to condition 61. As can be seen from FIG. 6, the analog input 51 at level 64 now produces an output 52 from A/D 29 of about hexadecimal "80", i.e about at the middle of the A/D's range of possible output values. As a result, during subsequent document scanning, and as the illumination intensity of light source 16 may change (usually it increases), A/D 29 will not likely be saturated by a shift in analog signal 51.

By way of yet another example, function line 62 is implemented, as above described, when the default condition of light source energization produces an actual magnitude of 65 for signal 51.

Figure 9:
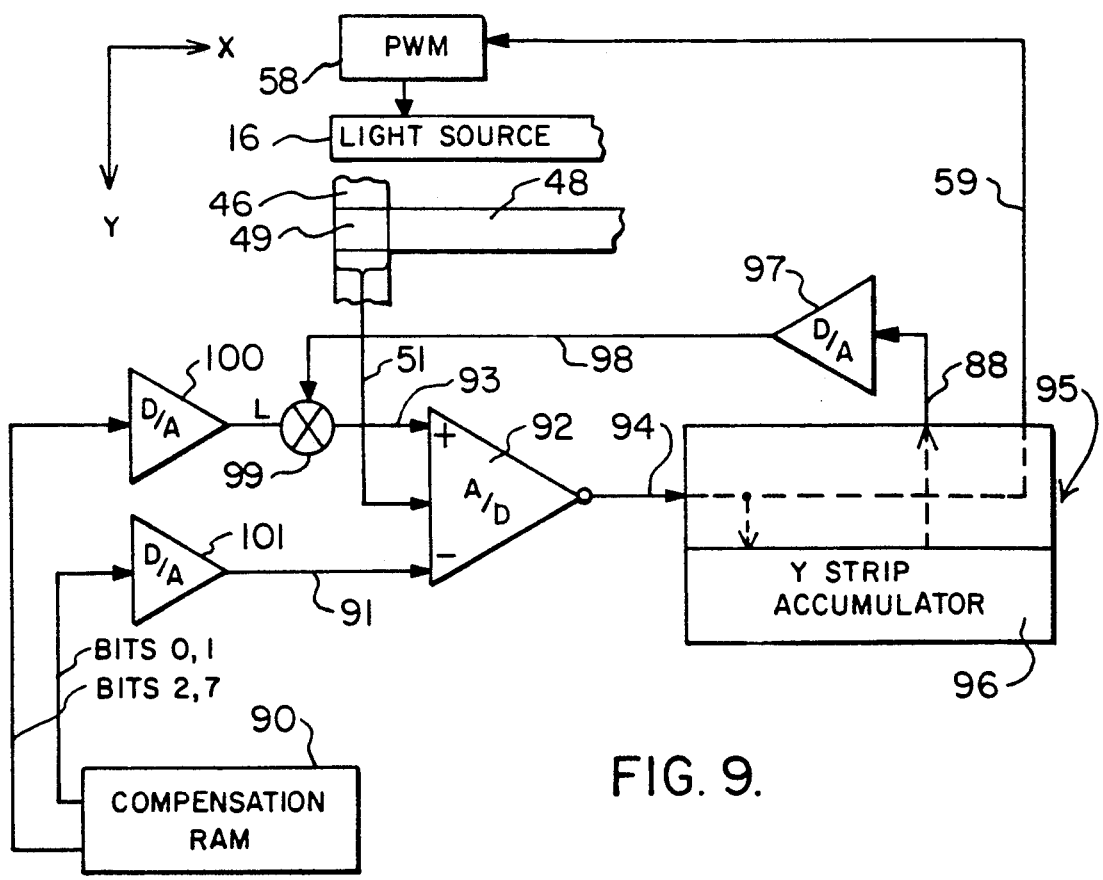
FIG. 9 is a showing of another embodiment of the invention wherein illumination compensation in accordance with the present invention is incorporated into circuit means that is disclosed and claimed in above mentioned copending application whereby the dark/light sensitivity of the sensor array is also compensated.

FIG. 9 is a showing of another embodiment of the invention. This embodiment shows a form of the invention that incorporates the illumination compensation of the present invention into the circuit means that is disclosed and claimed in above mentioned copending application Ser. No. 07/470,292 whereby the dark/light sensitivity of sensor portions 48,49 are compensated.

As is described in this copending application, the viewing of target portions 45,50 (FIG. 4) by sensor portions 48,49 while light source 16 is first deenergized and then energized, and prior to the beginning of a document scan, is operable to load compensation RAM 90 with one byte of compensation data for each sensor cell within sensor portions 48 and 49. Bits 0 and 1 of each compensation byte comprises dark sensitivity adjustment data for the sensor cell. Bits 2,7 of each compensation byte comprise light sensitivity adjustment data for the sensor cell.

Subsequently, and during a document scan, the content of RAM 90 is used to insure that equal quantities of cell illumination will produce equal output signals from all of the cells within sensor portions 48,49.

More specifically, and as is described in detail in this copending application, bits 0,1 of each compensation word are applied to minus reference input 91 of A/D 92, and bits 2,7 of each compensation word are applied to plus reference input 93 of A/D 92. In this way, the transfer function of A/D 92 is controlled as a function of each cell's dark/light sensitivity concomitantly with the analog output of the cell being applied to the signal input 51 of A/D 92. The digital output 94 of A/D 92 as is derived from sensor portion 48 comprises the document's electronic image signal, which signal is presented to other data processing devices (not shown), such as for example an image processor.

FIG. 9 shows the use of A/D 92 as it processes only the scan signals that are received from sensor portion 49, as this sensor portion views target portion 46 during a document scan. However, it is to be understood that A/D 92 also processes the scan signals that are received from sensor portion 48, as this sensor portion views a document.

In FIG. 9, should illumination intensity changes occur during a scan, the illumination intensity measuring signal at input 51 will operate to maintain the light output of source 16 substantially constant by way of control of PWM 58, as above described. However, should this manner of control not be possible without producing an undesirable condition of either too low or too high energization of light source 16, then signal 51 will operate to control the transfer function of A/D 92, not only for the cells of sensor portion 49, but also for the cells of sensor portion 49.

In this way, the signal processing means of FIG. 9 is not driven into saturation, and yet the sensor signals that are provided by sensor portion 49 for the target PELS, and the sensor signals that are provided by sensor portion 48 for the document PELS, throughout the document scan operation will continue to produce signals at the output 94 of A/D 92 in the same manner as if illumination had actually remained constant throughout the document scan operation.

As with previous embodiments of the invention, upon initial energization of light source 16, a predetermined default level of light energization is selected for light source 16, for example somewhere within the range of from 70 to 90 percent of the manufacturer's rated voltage and/or current for light source 16. The magnitude of A/D output signal 94 is then measured by microprocessor 95 at or before the beginning of a document scan operation, and this magnitude is stored, to be later used as a reference signal against which subsequent signals 94 will be compared as the document scan operation proceeds. When a variation in signal 94 is detected during a document scan operation, microprocessor 95 operates to change the magnitude of energization of light source 16, by way of PWM 58, so as to maintain signal 94 equal to, or substantially equal to, the aforementioned reference signal.

In accordance with this embodiment of the invention, the output 94 of A/D 92 from sensor portion 49 is also accumulated by microprocessor 95 in a memory portion 96 that is identified as a Y stripe signal accumulator. The content of memory portion 96 enables microprocessor 95 to determine that the control of light source energization by PWM 58, if it continues in the current trend, is about to move the energization of light source 16 out of a desired range of energization. When this event occurs, D/A 97 operates to provide an analog output 98 to summing junction 99 whereat bits 2,7 of the compensation words for the sensor cells are applied to the plus reference input 93 of A/D 92.

This output from D/A 97 operates to change the transfer function of A/D 92 in a manner to cause the observed trend in light energization to be altered, whereupon PWM 58 may again be used to maintain energization of light source 16 within a desired range of values. Thus, while continued document scanning thereafter occurs with a different actual level of illumination than was used in the earlier scan interval, since the transfer function of A/D 92 has been changed in a compensating manner, the magnitude of output 94 from A/D 92 remains unchanged for PELS of equal reflection characteristics.

For example, assume that the content of memory portion 96 indicates that light source 16 is likely to become overenergized if the control trend for PWM 58 continues. In this case, the output of D/A 97 operates to increase the gain of A/D 92. As a result, the signal 51 that previously indicated proper energization of light source 16 now suddenly produces an output 94 indicating that too high an energization of light source 16 is being implemented by PWM 58. As a result, the energization of light source 16 will be immediately decreased. The quantity of illumination thereafter being received by target portion 46 and the document is actually lowered. However, since the gain of A/D 92 has been increased for all of the signals that are received from sensor portions 48,49, the magnitude of output 94 from A/D 92 appears as if no change in illumination had occurred.

In this way, output 59 of microprocessor 95 provides continuous fine control of light energization by way of PWM 58, and output 88 of microprocessor 95 provides step-function course control of light energization by adjusting the transfer function of A/D 92, thus adjusting the effect that sensor signal 51 will have on the control of PWM 58.

Since the above described course control parameter effects the output of all sensor cells, the effect insofar as A/D output 94 is concerned is to provide an equal level of document illumination throughout the document scan.

Figure 7:
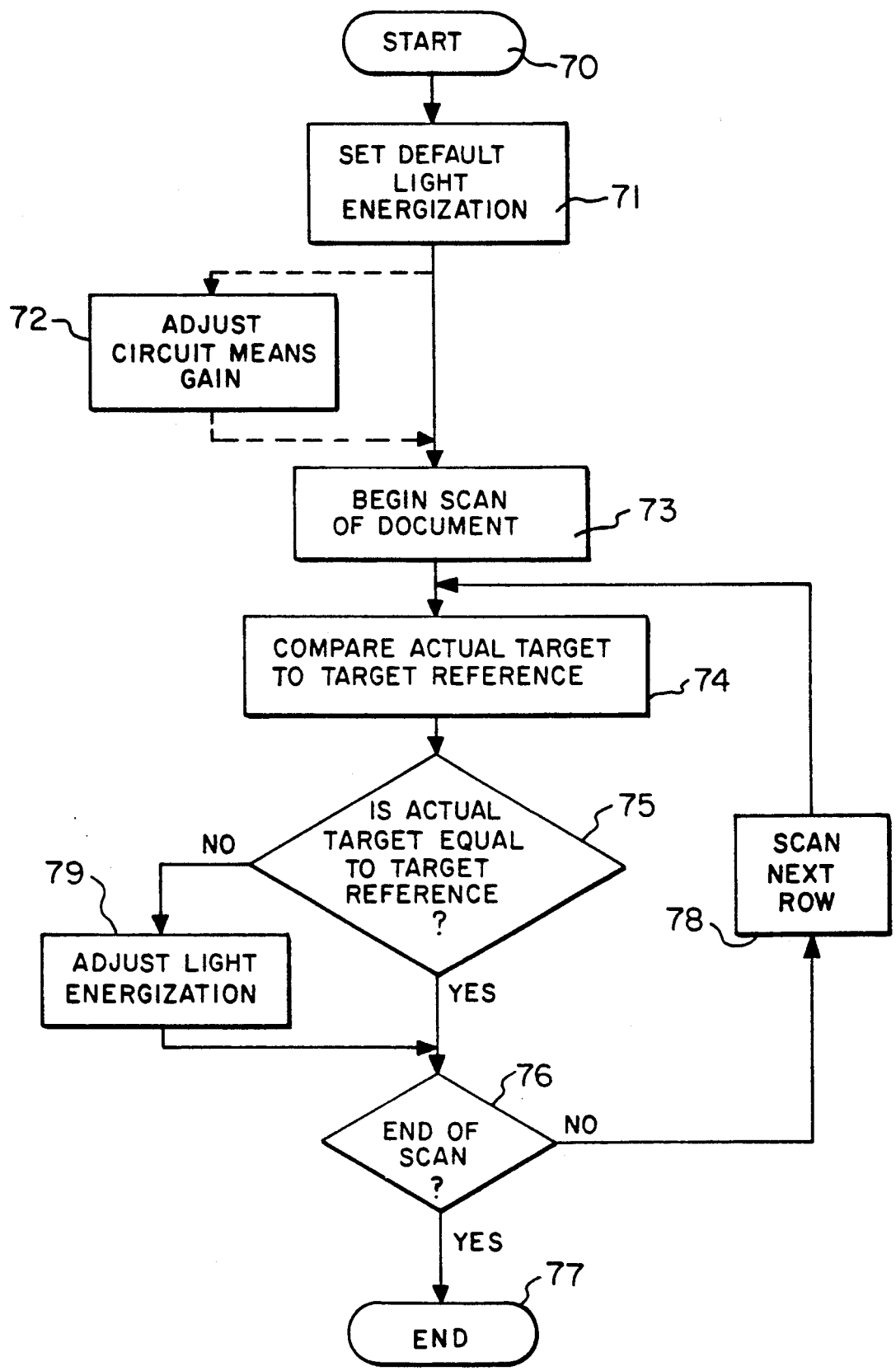
FIG. 7 is a flow chart showing of an embodiment of the invention.

While those skilled in the art will readily visualize a number of ways in which illumination compensation may be achieved within the spirit and scope of this invention, FIG. 7 is provided as an exemplary teaching that is applicable to all forms of document scanners.

The description of this Figure will begin at event 70, i.e. the receipt of a start command or a scan request by the scanner apparatus. In so far as this invention is concerned, the first step thereafter is to turn on the scanning light source of the scanner apparatus, i.e. event 71 occurs. This event operates to apply a predefined default level of energization to the light source. As a result, a certain level of illumination intensity is generated by the light source. For example, when the light source is early in its life cycle, this level of illumination will usually be higher than when the light source is near the end of its life cycle.

As a result of this light source energization, a quantity of light is reflected from the target means that simulates the background color tone of a typical document to be scanned, for example target portion 50 of FIG. 4.

In accordance with the above described automatic gain adjustment feature of the invention, event 72 may now be implemented if desired. That is, the gain of the circuit means that will be used to control energization of the light source during the subsequent document scan is adjusted to be at about mid range, so as to minimize the possibility of circuit saturation during the document scan. If this embodiment of the invention is to be used, it is preferable that event 72 occur before scanning of the document PEL rows actually begins.

After the light source is energized, and perhaps after the implementation of event 72, scanning of document PEL rows begins, i.e. at event 73 sensor array portion 48 of FIG. 4 begins detecting the PEL content of document 11, as sensor array portion 49 begins detecting the PEL row reflection from the target portion 46 that is located adjacent to edge 43 of platen 12.

As a result of the occurrence of event 73, event 74 occurs for the first scan row of target portion 46, which scan row corresponds to the first scan row of the document. That is, the quantity of light that is reflected from the first scan row of target portion 46 is compared to a reflectance reference value. This comparison has the capability of providing (1) an equal to, (2) a lower than, or (3) a higher than output, as shown by decision block 75.

In the event that the comparison output is equal to, or substantially equal to, the target reference, then decision block 76 determines if the document row being scanned is in fact the last row of the document. If it is, then end event 77 occurs. If it is not, then the next row of the FIG. 4 document 11 and target portion 46 is sampled or scanned, see event 78.

In the event that the comparison output is not equal to the target reference (decision block 75), then event 79 occurs, i.e. the energization of the scanning light source is dynamically adjusted in a manner to subsequently achieve the reference reflectance value from the reflection target. More specifically, if the output of comparison event 74 indicates that the quantity of light reflected from the target is less than the reference value, then energization of the light source is increased, to thereby subsequently increase the reflection received from the target. In the alternative, if the output of comparison event 74 indicates that the quantity of light reflected from the target is greater than the reference value, then energization of the light source is decreased, to thereby subsequently decrease the reflection received from the target.

The above description of embodiments of the invention makes reference to an event such as comparison event 74 occurring for each and every scan row of the document being scanned. It is to be understood, however, that within the spirit and scope of the invention such a comparison event 74 need not occur during every scan row of the document.

Document scanners are known wherein a document moves past a stationary light footprint, as the document is scanned, PEL row by PEL row.

Figure 8:
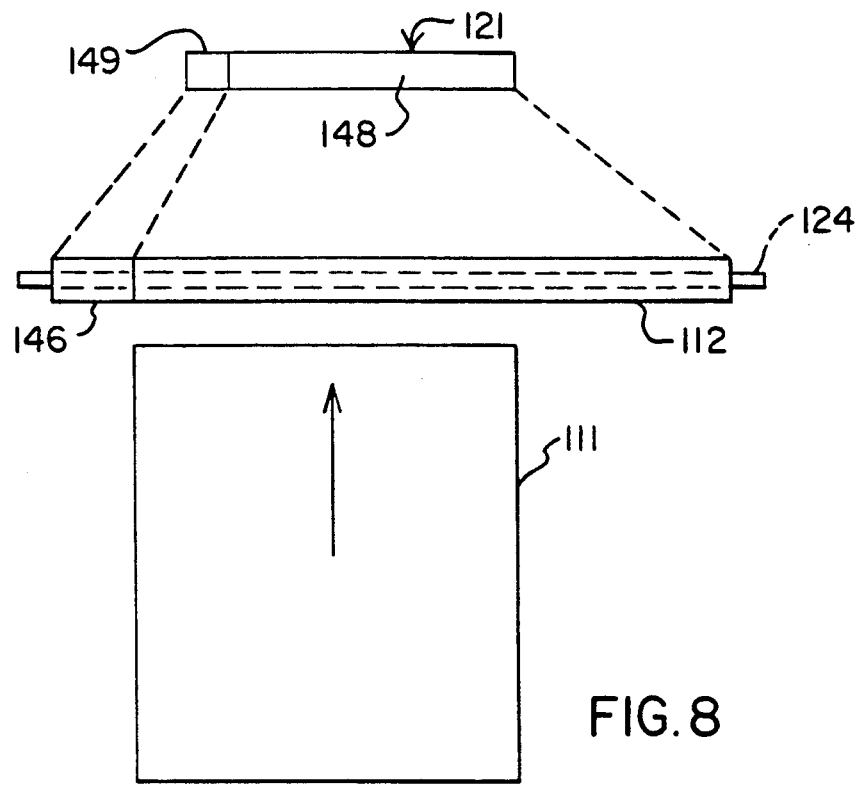
FIG. 8 is a showing of the invention applied to a document scanner apparatus of the stationary light source, moving document type.

FIG. 8 shows the present invention applied to such a scanner apparatus. In this Figure, an narrow, elongated, transparent, platen 112 includes a reflection target area 146 that is located at one or both ends thereof. Target 146 is of generally the same reflective characteristic as is target portion 46 that was described relative to FIG. 4. It will be noted that target 146 bears the same general operational relationship to platen 112 as target 46 bears to platen 12.

A stationary line or footprint of light 124 illuminates both platen 112 and target 146. This light footprint is generated by a light source similar to light source 16 of FIG. 1. Optical means of a well known construction and arrangement (not shown) operates to image the object plane of light footprint 124 onto the image plane of sensor array 121. Sensor array 121 corresponds in construction and arrangement to sensor array 21 of FIG. 4, and includes a relatively long portion 148 that views platen 112, and a relatively short portion 149 that views target 146.

Reference numeral 111 identifies a moving document that is to be scanned by the scanning apparatus. In the manner previously described relative to other embodiments of the invention, as document 111 moves over platen 112, and adjacent to target 146, the PEL content of document 11 is converted to an electronic equivalent of the visible image that is carried by the document, and concomitantly the light that is reflected from target 146 is used to maintain the intensity of light footprint 124 substantially constant during the scanning of all PEL rows of the document.

The above detailed description of the invention has made detailed reference to a number of embodiments of the invention. However, since it is apparent that those skilled in the art will readily visualize other embodiments of the invention in accordance with the teachings hereof, it is intended that the scope and spirit of the invention be limited solely by the following claims.

We claim:

1. Document scanner comprising:
   a) a generally elongated stationary target of substantially uniform reflectivity, the target being adjacent a receiving location of a document to be scanned;
   b) a light source comprising a fluorescent lamp arranged to simultaneously illuminate the target and the document to be scanned;
   c) an array of light detectors arranged to receive light reflected from the illuminated document and target during scanning, the array having an axis substantially perpendicular to a longitudinal axis of the target, a first plurality of the light detectors arranged to receive light reflected from only the target and each providing an output signal having a value indicative of the intensity of light reflected from a corresponding portion of the illuminated target;
   d) means for combining the values of the output signal on a scan row by scan row basis to provide for each scan row a single light intensity combined value indicative of the combination of the actual light intensity detected during scanning and defining an indication of actual light source intensity, said means for combining including an analog to digital converter (A/D) for digitizing said single light intensity combined value, said A/D characterized by a transfer function;
   e) a control circuit operatively coupled to p PWM circuit and said A/D and responsive to the indication of actual light source intensity and to a stored reference value to provide a variable control signal for energizing, and controlling the intensity of, the light source relative to the reference value, the control circuit controlling a PWM circuit that drives the light source with PWM pulses, and further comprising an accumulator for summing said single light intensity combined value for a plurality of scan rows, the control circuit controlling the PWM circuit according to the contents of the accumulator to provide trend analysis and prevent said light source from being overdriven, said control circuit providing continuous fine control of light source energization by way of said PWM circuit and further providing course control of light source energization by adjusting the transfer function of said A/D.

2. Apparatus according to claim 1 wherein the light source is energized at a pre-established default level prior to scanning, further comprising means for establishing and storing the reference value based upon the indication of actual light source intensity when the light source has been energized at the default level prior to scanning.

3. Apparatus according to claim 1 further comprising means for indexing the array in a direction parallel to the target.

4. Apparatus according to claim 1 wherein the means for combining comprises means for averaging the values of the output signals.

5. Apparatus according to claim 1 wherein a second plurality of light detectors is arranged to receive light reflected from the document during scanning and provide output signals indicative thereof, and wherein the output signals from the first and second plurality of light detectors are analog signals, further comprising an A/D for digitizing the analog signals and means responsive to the indication of actual light intensity for automatically and continuously adjusting a gain of the A/D during scanning to compensate for over-energization and under-energization of the lamp by the control circuit during a document scan.

6. Apparatus according to claim 5 wherein, during scanning, the gain of the A/D and the energization of the light source are automatically altered in a compensating manner to maintain a substantially constant range of digital values from the A/D while preventing the light source from being over-energized and under-energized.

7. Apparatus according to claim 2 wherein a second plurality of light detectors is arranged to receive light reflected from the document during scanning and provide output signals indicative thereof, and wherein the output signals from the first and second plurality of light detectors are analog signals, further comprising an A/D for digitizing the analog signals and means responsive to the indication of actual light source intensity for automatically adjusting a gain of the A/D to a preselected level prior to scanning.

* * * * *